Aug. 3, 1943.   C. F. SCHORN   2,325,884
FLOWMETER
Filed March 21, 1942
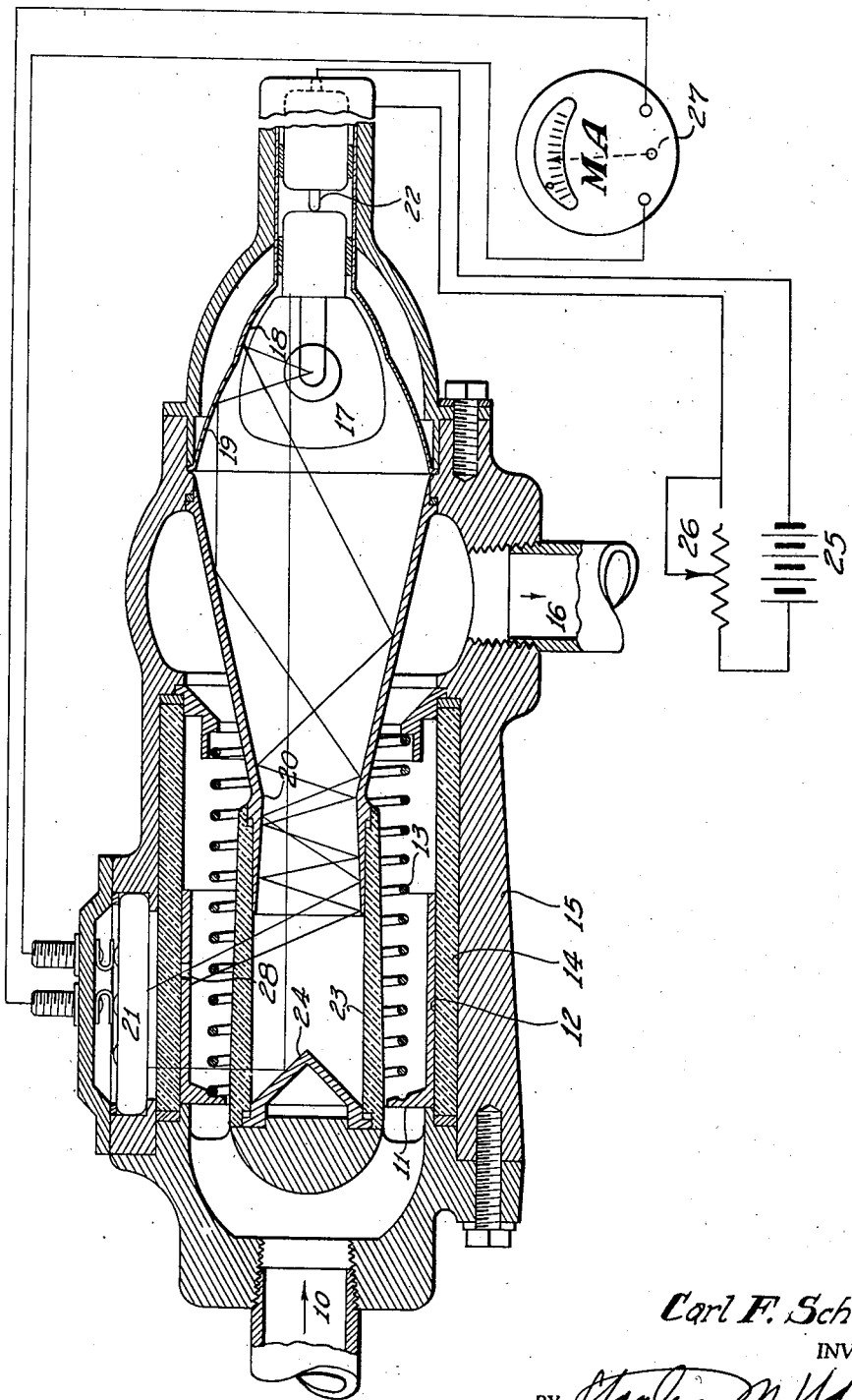
Carl F. Schorn
INVENTOR.
BY Patented Aug. 3, 1943

2,325,884

UNITED STATES PATENT OFFICE 2,325,884

FLOWMETER

Carl F. Schorn, Detroit, Mich.

Application March 21, 1942, Serial No. 435,612

2 Claims. (Cl. 73—209)

The object of this invention is to obtain a fuel flowmeter which will indicate uniformly for increments of flow. Many flowmeters now in use give an accurate reading for high rates of flow and a very approximate reading for low rates of flow, the reason being that the resistance to the flow of fuel varies as the square of the velocity and therefore, any flowmeter dependent on this property gives large readings for the higher rates of flow and low readings for the lower rates of flow. The object of this invention is, therefore, to secure uniform divisions on the scale.

The drawing illustrates the novel features of my invention.

In the figure, 10 is the fuel entrance which directs the flow against the annular disc 11 which forms the end of a sleeve 12. The annular disc 11 forms an obstruction to the fuel flow and engages with a compression spring 13. If the device is turned 90° into the vertical position and the sleeve 12 is made of heavy material, the spring 13 may be dispensed with. In either event, the sleeve 12 slides freely in a cylinder 14 which is contained in a casting 15. The cylindrical portion 14 is made of glass or transparent plastic material. There is an inner tube 23 also made of a similar transparent material, preferably a plastic. The surface of this inner tube 23 is tapered inwardly so that the distance between the inner lip of the annular disc 11 and the wall of the tapered tube 23 is increased as the flow increases and as the disc 11 compresses the spring 13. Fluid then flows to the outlet 16.

An electric bulb 17 is provided with a mirror having a portion 18 in the form of a sphere with the center of the electric bulb 17 as its center. A parabolic portion 19 of the mirror is also provided. The tube 23 is supported by the hollow conical element 20. The inside of the element 20 is polished so as to reflect light. 21 is a photoelectric cell. Electricity enters the electric bulb 17 through a connection 22.

The electric light bulb 17 obtains its electricity from the battery 25 and its intensity is controlled by the rheostat 26. For calibration, the gauge 27 marked MA-milliammeter is provided with a false zero. At zero flow some light falls onto the photoelectric cell 21 through the small opening 28 so that with no flow the gauge 27 gives a reading.

Operation

The rheostat 26 is adjusted so that at zero flow the milliammeter 27 indicates zero on the chart. This means that the light flowing through the opening 28 is just powerful enough to move the indicator from the real zero to the false zero.

During the operation of the device, the annular disc 11 is pushed over to the right by the pressure of the fluid flowing in at 10. The pressure difference between the left and right hand sides of the disc 11 is balanced by the spring 13. Hence, if the change in pressure of the spring is ignored, that is, if the spring be considered as though it were infinitely long, the flow would vary as the area between the disc 11 and the tube 23. However, the force exerted by the spring increases as it is compressed. Hence, the flow for a given movement of the disc 11 increases as the spring 13 is compressed. Hence, more accurate readings are obtained at the lower rates of flow than at the higher, exactly the reverse of the readings obtained with an ordinary venturi.

The light rays reflected in the lamp 17 are reflected by the parabolic surface 19 into the mouth of the cone 20 where they emerge into the interior of the tube 23. The walls of the tube 23 are transparent, so that the light emerges through the transparent wall 14 into the photoelectric cell 21 when the disc 11 is moved over to the right. By this means, it is possible to get an accurate indication of the flow of fluid at a rate of flow below that at which the ordinary Venturi meter would register. The greater the opening between the tapered tube 23 and the wall 11, the greater the amount of light which falls on the photoelectric cell 21. Hence, the gauge 27 can be calibrated to read in gallons per hour, for example.

The element 24 is a conical reflecting surface the function of which is to reflect light from the source of light 17—22 to the light responsive cell 21.

What I claim is:

1. In a flowmeter, a casing having an annular tapered passage comprising a tapered transparent wall and a cylindrical transparent wall, a moving cylindrical shield adapted to slide on said cylindrical wall, a fuel flow resisting element connected to said sliding cylindrical shield and adapted to provide a variable opening with said tapered wall, yieldable means for moving said sliding cylindrical shield against the flow of fluid, a source of light adapted to be projected through said casing, reflecting means for said light adapted to project the light rays through both the inner and outer transparent walls when said shield has been moved by the flow of fluid, photoelectric means located outside said outer transparent wall and adapted to receive said light that passes said shield when said shield is moved, and an electric indicator connected to said photoelectric means and adapted to indicate thereon the amount of light that has passed said shield.

2. A device as set forth in claim 1 in which there is a small opening in the shield permitting a minimum amount of light to pass through the shield to the photoelectric means when there is no flow through the flowmeter.

CARL F. SCHORN.